United States Patent
Berry et al.

(10) Patent No.: US 8,486,301 B2
(45) Date of Patent: Jul. 16, 2013

(54) METHOD OF PREPARING AND UTILIZING A CATALYST SYSTEM FOR AN OXIDATION PROCESS ON A GASEOUS HYDROCARBON STREAM

(75) Inventors: David A Berry, Morgantown, WV (US); Dushyant Shekhawat, Morgantown, WV (US); Mark Smith, Morgantown, WV (US); Daniel Haynes, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 227 days.

(21) Appl. No.: 13/028,303

(22) Filed: Feb. 16, 2011

(65) Prior Publication Data
US 2013/0146814 A1    Jun. 13, 2013

Related U.S. Application Data

(63) Continuation-in-part of application No. 12/422,346, filed on Apr. 13, 2009, now Pat. No. 8,133,463, and a continuation-in-part of application No. 12/717,372, filed on Mar. 4, 2010, now Pat. No. 8,142,756.

(60) Provisional application No. 61/305,166, filed on Feb. 17, 2010.

(51) Int. Cl.
C01B 3/26    (2006.01)
F23D 3/40    (2006.01)

(52) U.S. Cl.
USPC ............ 252/373; 423/651; 423/652; 431/3; 431/7

(58) Field of Classification Search
USPC ............ 423/652, 653, 651; 252/373; 431/3, 431/7
See application file for complete search history.

(56) References Cited

U.S. PATENT DOCUMENTS

| 4,055,513 | A | 10/1977 | Wheelock |
| 4,863,971 | A | 9/1989 | Broussard et al. |
| 6,238,816 | B1 * | 5/2001 | Cable et al. ............ 429/425 |
| 8,133,463 | B1 * | 3/2012 | Berry et al. ............ 423/418.2 |
| 8,142,756 | B1 * | 3/2012 | Gardner et al. ............ 423/651 |
| 2005/0265920 | A1 * | 12/2005 | Ercan et al. ............ 423/651 |

OTHER PUBLICATIONS

Lykhach et al., "Microscopic Insights into Methane Activation and Related Processes on Pt/Ceria Model Catalysts", ChemPhysChem 11 (2010).
Ruckenstein et al., "Carbon Deposition and Catalytic Deactivation during CO2 reforming of CH4 over Co/γ-Al2O3 Catalysts," Journal of Catalysis 205 (2002).
Chen et al., "Carbon deposited on Ni/Ce-Zr-O isooctane autothermal reforming catalysts", Journal of Catalysis 251 (2007).

* cited by examiner

*Primary Examiner* — Wayne Langel
(74) *Attorney, Agent, or Firm* — James B. Potts; Mark P. Dvorscak; John T. Lucas

(57) ABSTRACT

The disclosure relates to a method of utilizing a catalyst system for an oxidation process on a gaseous hydrocarbon stream with a mitigation of carbon accumulation. The system is comprised of a catalytically active phase deposited onto an oxygen conducting phase, with or without supplemental support. The catalytically active phase has a specified crystal structure where at least one catalytically active metal is a cation within the crystal structure and coordinated with oxygen atoms within the crystal structure. The catalyst system employs an optimum coverage ratio for a given set of oxidation conditions, based on a specified hydrocarbon conversion and a carbon deposition limit. Specific embodiments of the catalyst system are disclosed.

14 Claims, 4 Drawing Sheets

Coverage Ratio

METHOD OF PREPARING AND UTILIZING A CATALYST SYSTEM FOR AN OXIDATION PROCESS ON A GASEOUS HYDROCARBON STREAM

RELATION TO OTHER APPLICATIONS

This patent application claims priority from provisional patent application 61/305,166 filed Feb. 17, 2010, and further is a continuation-in-part of nonprovisional patent application Ser. No. 12/422,346 filed Apr. 13, 2009, now U.S. Pat. No. 8,133,463, and a continuation-in-part of nonprovisional patent application Ser. No. 12/717,372 filed Mar. 4, 2010, now U.S. Pat. No. 8,142,756, all of which are hereby incorporated by reference in their entirety.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The process relates to a method of utilizing a catalyst system for an oxidation process on a gaseous hydrocarbon stream with a mitigation of the deleterious effects of carbon accumulation. The system is comprised of a catalytically active phase deposited onto an oxygen conducting phase, with or without supplemental support. The catalytically active phase has a specified crystal structure where at least one catalytically active metal is a cation within the crystal structure and coordinated with oxygen atoms within the crystal structure. The catalytically active phase is deposited on the oxygen conducting phase with an optimum coverage ratio for a given set of oxidation conditions, based on a specified hydrocarbon conversion and a carbon deposition limit. The coverage ratio may be a function of the number of deposited catalytic activity phase sites where the sites have a relatively constant volume-to-surface area, the volume-to-surface area ratio of the catalytic activity phase or the oxygen conducting phase, or other means which may be envisioned. The specified hydrocarbon conversion and the carbon deposition limit are optimized by a user for the specific set of oxidation conditions. The oxidation process may be, for example, partial oxidation, steam reforming, $CO_2$ reforming, combustion, or a combination thereof. Specific embodiments of the catalyst system are disclosed.

BACKGROUND

Catalyst deactivation due to carbon accumulation is one of the most difficult challenges in the design and preparation of catalysts for the reforming of hydrocarbon fuels. Carbon deposits decrease catalyst activity by blocking active sites, causing attrition of catalyst particles and results in increasing pressure drop and ultimately discontinuation of the process.

Carbon may form readily via, for example, hydrocarbon decomposition and CO disproportionation. On a supported metal catalyst such as Pt or Ni deposited onto a relatively non-oxygen conducting phase such as alumina, carbon accumulates on the support and at a certain level begins to block the active metal sites, deactivating the catalysts rapidly. This tendency has been related to the concentration of acid sites on the support. Additionally, certain catalytically active metals such as Ni dispersed on a support form a filamentous carbon which tends to lift the catalyst from the support rapidly under operating conditions. Reducing the size of the Ni metal particles has been shown to slow down the overall rate of accumulation of the carbon filament. It is therefore generally understood that the support and the active metal play an important role in ensuring catalyst stability. See e.g., Lercher et al., "Design of stable catalysts for methane-carbon dioxide reforming," $11^{th}$ *International Congress on Catalysis—$40^{th}$ Anniversary, Studies in Surface Science and Catalysis* 101 (1996), among others.

It is also understood that carbon accumulation is mitigated by the oxidation of atomic carbon to CO or $CO_2$ prior to the formation of stable carbon networks on the catalyst surface. Detailed oxygen exchange mechanisms between the catalyst and the gaseous stream have been proposed in a series of well-differentiated steps, initiated by dissociative adsorption of oxygen on the active metal sites. It has been suggested that oxygen exchange rate is controlled by the adsorption-desorption of oxygen on the active metal particles, and that the active metal particles serve as descriptive portholes for the subsequent migration of oxygen to the support. The specific action between carbon and oxygen leading to CO or $CO_2$ formation and the mitigation of carbon accumulation beyond this point is less well understood, however in certain catalysts it has been demonstrated that the oxygen required for CO or $CO_2$ formation generates from lattice oxygen within the bulk of the catalyst. For example, in evaluations utilizing a gadolinium doped ceria support, $^{18}O$ and $^{16}O$ isotopic exchange studies indicate that partial oxidation of methane using a Rh catalyst initially produced predominantly $C^{18}O$, indicating that the oxygen required for the CO formation originated from the catalyst. See Salazar-Villapando et al., "Role of lattice oxygen in the partial oxidation of methane over Rh/zirconia-doped ceria. Isotopic studies" *International Journal of Hydrogen Energy* 35 (2010), which is hereby incorporated by reference in its entirety.

Further, it is understood that certain oxides may directly exchange $^{18}O$ and $^{16}O$ with a gaseous stream in the absence of a supported metal. See e.g., Martin et al., "Mobility of Surface Species on Oxides. 1. Isotopic Exchange of $^{18}O_2$ with $^{16}O_2$ of $SiO_2$, $Al_2O_3$, $ZrO_2$, MgO, $CeO_2$, and $CeO_2$—$Al_2O_3$. Activation by Noble metals. Correlation with Oxide Basicity", *J. Phys. Chem.* 100 (1996).

Active metal sites have been dispersed on oxygen conducting phases for the mitigation of carbon accumulation. In these catalysts, the active metallic sites are deposited directly onto the oxygen conducting phase, and the loading of the isolated metal on the support is based on avoidance of phenomena stemming from the reactive nature of the metal itself. For example, when unconstrained by a crystal structure, the metallic sites are prone to sintering with adjacent metal sites, reacting with the oxygen conducting phase to form intermetallic compounds, or engaging in other thermodynamically favorable reactions which act to degrade the performance of the catalyst. Typically, when loading has been varied and performance evaluated for these dispersed metal catalysts, the optimum point has been identified as some loading which maximizes active metal content while avoiding the degrading tendencies of the metallic sites themselves—such as sintering, intermetallic formation, or other reactions—in order to provide activity and selectivity with an acceptable rate of carbon deposition. In these situations, the behavior of the metallic sites themselves rather than carbon oxidation through the action of the oxygen conducting phase becomes the limiting point. For example, situations may arise where a given metal loading provides for essentially complete carbon oxidation, but where the response of the metal sites at that particular loading leads to rapid catalyst deactivation. See e.g., Ruckenstein et al., "Carbon Deposition and Catalytic Deactivation during $CO_2$ reforming of $CH_4$ over $Co/\gamma-Al_2O_3$ Catalysts", *Journal of Catalysis* 205 (2002).

It would be advantageous to provide a catalyst system where an active catalytic component could be dispersed onto an oxygen conducting phase in a manner that mitigates concerns associated with sintering, intermetallic formation, or other reactions typically identified as the limiting impact on support loading. Providing sufficient stability to the active metal sites under applicable operating conditions would provide additional freedoms in the active metal loading and the relative quantities of the active metal and an oxygen conducting phase, offering general improvement in catalytic performance. It would be additionally advantageous if the relationship between the dispersed active metal sites and the oxygen conducting phase provided for an optimization of conversion, product composition, and carbon deposition in an oxidation process, enhancing the performance of the catalyst system over an expected lifetime. It would further be advantageous if the catalyst system incorporated a mode of operation between active metal sites bound within the structure of a crystal lattice and the oxygen conducting phase based on the oxidation conditions of a specific application, in order to prepare the catalyst system for a performance based on the specific application and end-user preferences.

Accordingly, it is an object of this disclosure to provide a catalyst system having a catalytically active phase dispersed on an oxygen conducting solid, where the catalytically active phase incorporates active metal sites bound within the crystal lattice of a host structure.

Further, it is an object of this disclosure to provide a catalysts system whereby the crystal structure having active metal sites may be dispersed on the oxygen conducting phase in a manner providing for optimum product composition with mitigated carbon deposition.

Further, it is an object of the disclosure to provide a means by which an optimum coverage ratio of the catalytically active phase on the oxygen conducting phase may be determined for a specific application of an oxidation process.

Further, it is an object of the disclosure to provide a means by which oxygen exchange between a gaseous stream containing hydrocarbons and an oxidant may be optimized based on catalysis at the active sites, as opposed to limitations imposed by sintering, intermetallic formation, or other reactions typically identified as the limiting impact on metal loading.

Further, it is an object of the disclosure to provide a means for achieving a mode of operation between active metal sites bound within the structure of a crystal lattice and the oxygen conducting phase based on the oxidation conditions of a specific application, in order to prepare the catalyst system for a performance based on the specific application and end-user preferences.

These and other objects, aspects, and advantages of the present disclosure will become better understood with reference to the accompanying description and claims.

SUMMARY

The process as disclosed herein is a method of utilizing a catalyst system for an oxidation process on a gaseous hydrocarbon stream with a mitigation of carbon accumulation. The system is comprised of a catalytically active phase deposited onto an oxygen conducting phase, with or without supplemental support. The catalytically active phase is deposited on the oxygen conducting phase with an optimum coverage ratio for a given set of oxidation conditions, based on a specified hydrocarbon conversion and a carbon deposition limit. The coverage ratio may be a function of the number of deposited catalytic activity phase sites where the sites have a relatively constant volume-to-surface area, the volume-to-surface area ratio of the catalytic activity phase or the oxygen conducting phase, or other means. The specified hydrocarbon conversion and the carbon deposition limit are optimized by a user for the specific set of oxidation conditions. The oxidation process may be, for example, partial oxidation, steam reforming, $CO_2$ reforming, combustion, or a combination thereof.

The catalytically active phase has a specified crystal structure where at least one catalytically active metal is a cation within the crystal structure and coordinated with oxygen atoms within the crystal structure. Exemplary crystal structures include perovskites, hexaaluminates, and pyrochlores, among others. The oxygen conducting phase is a metal oxide or mixed-metal oxide that possesses enhanced properties related to the adsorption and transport of oxygen/oxygen species from a reactant mixture to the active phase. The disclosure further provides a method by which the catalytically active phase is deposited onto the oxygen conducting phase with an optimum coverage ratio for a given set of oxidation conditions. These two phases can then be supported by an optional inert substrate comprised of metal or oxide-based materials.

The catalyst system is prepared with an appropriate coverage ratio of the catalytically active phase on the oxygen conducting phase for the given set of oxidation conditions. The coverage ratio refers to the ratio of catalyst surface area to a total surface area, where the catalyst surface area is the surface area of the catalytically active phase, and where the total surface area is a summation of the catalyst surface area and the surface area of the oxygen conducting phase. The coverage ratio is expected to vary based on preparation techniques and other factors, and may be determined through various techniques known in the art, such as scanning electron microscopy or other techniques. The coverage ratio may be a function of the number of deposited catalytic activity phase sites where the sites have a relatively constant volume-to-surface area, the volume-to-surface area ratio of the catalytic activity phase or the oxygen conducting phase, or other means.

An advantageous coverage ratio for a specific application under specified oxidation conditions may be determined through the performance of catalyst systems prepared at various coverage ratios and evaluated using a representative gas stream under the specified oxidation conditions. The process may be used to generate evaluation points based on coverage ratio where the quantity of coverage ratios evaluated is determined by a user, and may be based on, for example, bracketing a minimum carbon deposition, bracketing a specific product composition, general knowledge of the catalytically active phase and oxygen conducting phase under evaluation, or other criteria germane to the catalyst system and the specific application intended. The plurality of evaluation points may then be evaluated and the advantageous coverage ratio selected based on the product composition, the carbon deposition, and the desired outcome the specific application.

The novel process and principles of operation are further discussed in the following description.

DETAILED DESCRIPTION

Figure 1:
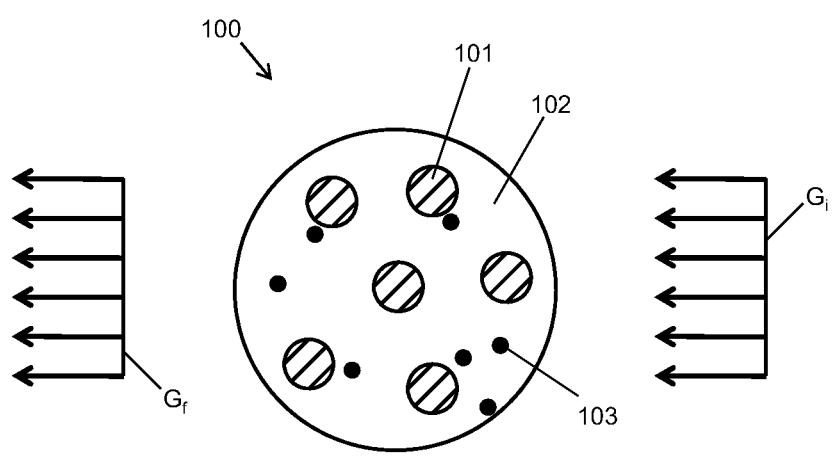
FIG. 1 provides a schematic illustration of the catalyst system comprised of a catalytically active phase and an oxygen conducting phase.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process whereby a catalyst system having a catalytically active phase deposited on an oxygen conducting phase with a defined coverage ratio may be utilized for an oxidation process on a gaseous stream comprised of hydrocarbons, such that the oxidation process produces a specified chemical composition and maintains carbon deposition below a carbon deposition limit.

The invention is a method of utilizing a catalyst system for an oxidation process on a gaseous hydrocarbon stream with a mitigation of carbon accumulation. The system is comprised of a catalytically active phase deposited onto an oxygen conducting phase, with or without supplemental support. The catalytically active phase is deposited on the oxygen conducting phase with an optimum coverage ratio for a given set of oxidation conditions, based on a specified hydrocarbon conversion and a carbon deposition limit. The specified hydrocarbon conversion and the carbon deposition limit are optimized by a user for the specific set of oxidation conditions. The gaseous stream is further comprised of an oxidant, for example $O_2$, $CO_2$, or $H_2O$. The oxidation process may be, for example, partial oxidation, steam reforming, $CO_2$ reforming, combustion, or a combination thereof. The oxidation process may be steam reforming where the oxidant is comprised of steam, or oxidative steam reforming where the oxidant is comprised of oxygen and steam, or autothermal reforming where the oxidant is comprised of oxygen and either carbon dioxide or steam, or $CO_2$ reforming where the oxidant is comprised of carbon dioxide.

The catalytically active phase has a specified crystal structure where at least one catalytically active metal is a cation within the crystal structure and coordinated with oxygen atoms within the crystal structure. Exemplary crystal structures include perovskites, hexaaluminates, and pyrochlores, among others. Exemplary catalytically active phases include the hexaaluminates and pyrochlores disclosed in U.S. application Ser. No. 12/422,346 filed by Berry et al., filed Apr. 13, 2009, and U.S. application Ser. No. 12/717,372 filed by Gardner et al., filed Mar. 4, 2010, among others. The oxygen conducting phase is a metal oxide or mixed metal oxide that possesses enhanced properties related to the adsorption and transport of oxygen/oxygen species from a reactant mixture to the active phase. Exemplary oxygen conducting phases include ceria, gadolinium-doped ceria, zirconium-doped ceria, and yttrium-stabilized zirconia, among others. The disclosure further provides a method by which the catalytically active phase is deposited onto oxygen conducting phase with an optimum coverage ratio for a given set of oxidation conditions. These two phases can then be supported by an optional inert substrate comprised of metal or oxide-based materials.

The catalyst system is prepared for the appropriate coverage ratio of the catalytically active phase to the oxygen conducting phase for the given set of oxidation conditions (i.e. fuel-oxidant mixture, space velocity, pressure, temperature). This coverage ratio may be determined such that desired hydrocarbon conversion is achieved while balancing the rate of carbon deposition to be roughly equivalent to or less than the rate of carbon removal resulting from the presence of the oxygen conducting phase, or less than the user specified carbon deposition limit. These rates are affected by several factors including but not limited to the following: (1) the physico-chemical properties of the catalytically active phase (i.e. metal content, crystal structure, morphology, oxygen conductivity, etc.); (2) the dimensions and pattern of the deposited catalytically active phase; (3) the method for depositing the catalytically active phase onto the oxygen conducting phase and subsequent thermal treatment; (4) the oxygen transport properties of the oxygen conducting phase (i.e. capture, storage capacity, dissociation, conduction, exchange, etc.) See e.g., Smith et al., "Partial Oxidation of liquid hydrocarbons in the presence of oxygen-conducting supports: Effect of catalyst layer deposition," *Fuel* 89 (2010), which is hereby incorporated by reference.

Within this disclosure, "coverage ratio" refers to the ratio of catalyst surface area to a total surface area, where the catalyst surface area is the surface area of the catalytically active phase, and where the total surface area is a summation of the catalyst surface area and the surface area of the oxygen conducting phase. The coverage ratio is expected to vary based on preparation techniques and other factors, and may be determined through various techniques known in the art, such as scanning electron microscopy or other techniques. Further, the term coverage ratio connotes the ratio of catalyst surface area to a total surface area regardless of how the ratio is achieved. For example, a given coverage ratio can be achieved through variations in deposit size and distance between each deposit, where the deposit size refers to the area of a single deposit site of the catalytically active phase. It is understood that within some oxidation process applications, variations within the given coverage ratio may be advantageous—for example, smaller deposits and greater distances between deposits, or vice versa. Such variation is included within the term "coverage ratio" as used in the disclosure herein.

The disclosure herein provides an oxidation process using a catalyst system comprised of a catalytically active phase deposited onto an oxygen conducting phase, in order to provide a means by which the activity of the catalytically active phase and the oxygen conducting nature of the oxygen conducting phase may be optimized for a given set of oxidation conditions. The optimization is conducted via a coverage ratio, which is defined as the area of the catalytically active phase divided by the total area of the catalyst system, where the total area is the summation of the areas of the catalytically active phase and the oxygen conducting phase. The catalytically active phase is a specified crystal structure providing at least one catalytically active metal as a cation within the crystal structure. The catalytically active phase provides for active metal dispersion and size stability, and further provides for maximizing the exposure of the oxygen conducting phase when the catalyst system is exposed to a gaseous hydrocarbon stream under the oxidation conditions. The catalytically active phase has a greater catalytic activity toward the hydrocarbons than the oxygen conducting phase, and the oxygen conducting phase enhances the availability of oxygen required for CO or $CO_2$ formation through increased contact with the gaseous hydrocarbon stream. This arrangement allows relatively independent variance of the catalytic activity and the availability of oxygen from the hydrocarbon stream, and provides for an optimization between products formed and the carbon accumulation experienced during an oxidation process.

The approach differs from that typically employed when active metal sites are dispersed on an oxygen conducting phase without additional inclusion within a crystal structure as specified here. In these catalysts, the active metallic sites are deposited directly onto the oxygen conducting phase, and the loading of the isolated metal on the support is based on avoidance of phenomena stemming from the reactive nature of the metal itself. For example, when unconstrained by a crystal structure, the metallic sites are prone to sintering with adjacent metal sites, reacting with the oxygen conducting phase to form intermetallic compounds, or engaging in other thermodynamically favorable reactions which act to degrade the performance of the catalyst. Typically, when loading has been varied and performance evaluated for these dispersed metal catalysts, the optimum point has been identified as some loading which maximizes active metal content while avoiding the degrading tendencies of the metallic sites themselves—such as sintering, intermetallic formation, or other reactions—while providing for adequate carbon deposition rates. In these situations, the behavior of the metallic sites themselves rather than carbon oxidation through the action of the oxygen conducting phase becomes the limiting point. For example, situations may arise where a given metal loading provides for essentially complete carbon oxidation, but where the response of the metal sites at that particular loading leads to rapid catalyst deactivation. See e.g., Ruckenstein et al., "Carbon Deposition and Catalytic Deactivation during $CO_2$ reforming of $CH_4$ over Co/γ-$Al_2O_3$ Catalysts", *Journal of Catalysis* 205 (2002).

An advantage of the disclosure herein is mitigation of metallic site action through incorporation in the crystal structure. The crystal structures such as pyrochlore, perovskites, and hexaaluminas display chemical and thermal stability with high melting points and show the mechanical strength necessary to accommodate metal substitutions necessary for high catalytic activity. The resistance to decomposition at high reforming temperatures provides an active and well dispersed metal bound in the crystal structure, and largely avoids a catalytic design methodology where the sintering or transitional behavior of the metallic sites themselves act as the limiting point. By both enhancing the stability of a catalytic metal by placing it as a bound cation in a crystal structure and distributing the crystal structure across the oxygen conducting phase, an optimum balance between the catalytic activity of the bound metal and the oxygen conducting nature of the oxygen conducting phase can be realized with mitigated regard toward the deactivating effects of migrating metal sites under the influence of the operating conditions.

Inventors have determined that the catalytic process occurring on the catalytically active phase and the oxygen sorption and transport occurring on the oxygen conducting phase cooperatively operate in such a manner that an optimum coverage ratio of catalytically active phase to oxygen conducting phase exists for an oxidation process on a gaseous hydrocarbon stream. The catalytic activity of the catalytically active phase is maximized based on characteristics such as size and dispersion and also based on the availability of localized oxygen for CO or $CO_2$ production supplied from the lattice of the oxygen conducting phase. The degree to which the oxygen conducting phase is exposed to the gaseous stream generally determines the oxygen exchange from the gaseous phase and the availability of lattice oxygen supplied to the catalytically active phase. Without being bound by theory, the degree to which the catalytically active phase and the oxygen conducting phase are present in the catalyst system governs the chemical composition of the products produced and the amount of carbon deposition on the catalyst system. The operating point may shift based on the ratio of the catalytically active phase to the oxygen conducting phase, as well as individual characteristics of the catalytically active phase and the oxygen conducting phase, and the catalyst system may be prepared to function at a given operating point based on the oxidation conditions present.

FIG. 1 schematically illustrates a catalyst system 100 comprised of a catalytically active phase and an oxygen conducting phase. The catalytically active phase is represented at FIG. 1 as a plurality of active sites such as active site 101 distributed across and in physical contact with the surface of oxygen conducting phase 102. The catalytically active phase is a crystal structure comprised of a catalytically active metal serving as a cation within the crystal structure and coordinated with oxygen atoms within the crystal structure. For example, the catalytically active phase may be comprised of a pyrochlore, hexaalumina, or perovskite where at least one catalytically active metal serves as a cation within the crystal structure and is coordinated with oxygen atoms within the crystal structure. The crystal structure may be comprised of multiple catalytically active metals, and may further be comprised of metals incorporated to enhance the oxygen conducting abilities of the crystal structure itself. See, e.g., U.S. application Ser. No. 12/422,346 and U.S. application Ser. No. 12/717,372. The particular crystal structure utilized may be selected based on various operating criteria. Typically, the crystal structure is selected based on the catalytically active metals which may be accommodated within the structure, the stability of the crystal structure under the oxidation conditions, the resulting dispersion of the catalytically active metal within the crystal structure, and other factors familiar to those skilled in the art. The catalytically active phase may be further comprised of active metals not within the crystal structure but residing on the surface of the crystal structure due to, for example, migration during preparation, migration during use in the operating environment, or intentional inclusion.

The catalytically active phase comprised of active sites such as active site 101 is catalytically active for a specified hydrocarbon conversion resulting from contact between the catalytically active phase and a gaseous stream under a given set of oxidation conditions. For example, at FIG. 1, gaseous stream $G_i$ comprised of a hydrocarbon and an oxidant flows across catalyst system 100. Gaseous stream $G_i$ is under conditions defined by an oxygen-carbon (O/C) ratio, an oxidation temperature, and an oxidation pressure. These oxidation conditions are sufficient to oxidize carbon in the hydrocarbons comprising gaseous stream $G_i$ as a result of contact with the catalytically active phase. Following contact, product stream $G_f$ having a chemical composition is produced. For example, the oxidation process may be a partial oxidation and gaseous stream $G_i$ may be comprised of $C_nH_m$ and $O_2$. As a result of contact between gaseous stream $G_i$ and the catalytically active phase under the oxidation conditions, product stream $G_f$ comprised of $H_2$ and CO is produced.

At FIG. 1, contact occurs at a Gas Hourly Space Velocity (GHSV), defined as the volume of gaseous mixture measured at standard temperature and pressure passed over a unit weight of catalyst system per hour. Additional hydrocarbons and other molecules will likely be present in product stream $G_f$, with relative concentrations depending on the activity of the catalytically active phase, the exposed surface area of the catalytically active phase, and other factors. The extent of CO production in the partial oxidation process is dependent in part on the availability of lattice oxygen supplied to, for example, active site 101 from oxygen conducting phase 102.

Oxygen conducting phase 102 is an oxygen conducting oxide such as doped or undoped $ZrO_2$, $CeO_2$, or others known in the art. Oxygen conducting phase 102 is less catalytically active than the catalytically active phase for the oxidation process under the oxidation conditions. The catalytic activity of the catalytically active phase relative to the oxygen conducting phase may be determined through comparison of various parameters known in the art, for example, through relative comparison of the turnover rates of the oxygen conducting phase and the catalytically active phase under the oxidation conditions, where the turnover rate is defined as the number of hydrocarbon molecules reacted on one active site per unit of time. At FIG. 1, oxygen conducting phase 102 is in physical contact with the plurality of active sites comprising the catalytically active phase, and further in contact with gaseous stream $G_i$. As a result, oxygen conducting phase 102 may interact with the oxidant in gaseous stream $G_i$ for replenishment of lattice oxygen supplied to the active sites, such as active site 101.

The catalytically active phase comprised of active sites such as active site 101 is active for the production of $H_2$ and CO or $CO_2$ following contact with gaseous stream $G_i$ under appropriate oxidation conditions. During this process, atomic C is produced and may be oxidized to CO or $CO_2$ depending on the oxidation process, or may begin to form a carbon network over the catalytically active phase and the oxygen conducting phase. If allowed, the carbon network begins to occlude the catalytically active sites such as active site 101, degrading the performance of the catalyst system over time. Exemplary carbon accumulation is shown at FIG. 1 as a plurality of carbon depositions, such as carbon deposition 103. In the absence of oxygen conducting phase 102, increasing the contact between the catalytically active phase and gaseous stream $G_i$ would be expected to increase the catalytic rate and increase the concentration of the desired product, for example $H_2$, in product stream $G_f$; however, it would also be expected that the increased contact and increased catalytic rate would correspondingly increase the carbon deposition rate and decrease the useful life of the catalyst. An advantage of the disclosure herein is the use of oxygen conducting phase 102 to extend the useful life of the catalyst system through the supply of lattice oxygen to oxidize carbon generated by the catalytically active phase. With the catalytically active phase comprised of an active metal bound within a crystal structure, the ratio of the catalytically active phase to the oxygen conducting phase may be optimized without particular regard to coalescence, sintering, intermetallic formation, or other considerations which arise when active metals are directly supported on a support.

As discussed, the term coverage ratio connotes the ratio of catalyst surface area to a total surface area regardless of how the ratio is achieved. For example, at FIG. 1, variations in the deposit size of active site 101 and a representative distance between each deposit may occur within a specified coverage ratio. It is understood that within some oxidation process applications, variations within the specified coverage ratio may be further advantageous—for example, smaller deposits and greater distances between deposits, or vice versa. For example, At FIG. 1, the catalytically active phase is a plurality of deposit sites such as active site 101, and the catalyst surface area is the combined area of the plurality of deposit sites. The plurality of deposit sites can be characterized by a deposit size, where the deposit size is the average surface area possessed by a given deposit site in the plurality, such as active site 101. Further, the plurality of deposit sites may be characterized by a representative displacement, where the representative displacement is an average distance between a given deposit site in the plurality of deposit sites and a nearest neighbor deposit site. A specified coverage ratio may be achieved with varying deposit sizes and representative displacements in order to facilitate a desired result for the oxidation process under consideration.

In an embodiment, the optimum ratio of the catalytically active phase to the oxygen conducting phase provides a balance, where the catalytically active phase produces atomic carbon as a result of catalysis and the oxygen conducting phase provides for oxidation of the carbon by oxygen arising from within the lattice of the oxygen conducting phase. During this process, the oxygen supplied from the lattice of the oxygen conducting phase is replenished through contact with the oxidant in the gaseous stream. The oxygen conducting phase is less catalytically active than the catalytically active phase, so that any catalysis which might otherwise occur on the oxygen conducting phase is mitigated. In this embodiment, the catalyst system provides a product stream $G_f$ having a chemical composition over a process time period while essentially all atomic carbon liberated from the hydrocarbon is oxidized to CO or $CO_2$, depending on the process conditions, and the useful life of the catalyst system is maximized. The chemical composition may be defined in various manners. For example, the chemical composition may be defined by the mole percentage (mol %) of hydrocarbon in the gaseous stream $G_i$ converted to a particular product such as $H_2$ at the oxidation conditions over the process time period.

In an embodiment such as that described above, the catalytic rate of the catalytically active phase may be increased through increasing the degree of contact between the catalytically active phase and the gaseous stream $G_i$. As is known in the art, contact may be enhanced through decreasing the size of catalytically active sites so that the ratio of surface area-to-volume is increased for a given active site. This results in increased catalysis for a given loading of active metal and may, for example, result in a larger concentration of $H_2$ produced from a gaseous stream of $C_nH_m$ for the given metal loading. However, increased fabrication complexity and cost may preclude the pursuit of progressively smaller active site sizes, and a decision may be made to, for example, accept a lower $H_2$ production rate rather than decrease active site size. In such a situation, the ratio between the catalytically active phase and the oxygen conducting phase may be based on eliminating carbon deposition to prolong catalyst system life, or limiting carbon deposition to a specific carbon deposition limit over an expected life of the catalyst system prior to catalyst system change out in an operating system.

In operation, the catalyst system provides an oxidation process on a gaseous stream under a set of oxidation conditions and over a process time period, where the oxidation process produces products having a specified chemical composition and results in carbon deposition on the catalyst system less than a carbon deposition limit. For example, the specified chemical composition may be an $H_2$ percentage in product stream $G_f$ over an oxidation time period. The carbon deposition limit may be substantially zero, or may be some other value providing for acceptable catalytic performance over an intended catalyst system life. The catalytically active phase is comprised of a specified crystal structure where at least one catalytically active metal is a cation within the crystal structure. The oxygen conducting lattice provides oxygen for the oxidation of generated carbon from the lattice of the oxygen conducting phase, and replenishes supplied oxygen from the gaseous stream sufficiently to meet the carbon deposition limit. The optimum ratio between the catalytically active phase and the oxygen conducting phase is maintained in order to produce the specified chemical composition while meeting the carbon deposition limit.

Generally speaking, the accessible surface area of the oxygen conducting phase relative to the catalytically active phase has a lower bound based on sufficient contact with the gaseous stream such that oxygen utilized in the oxidation of carbon can be replenished by the oxidant. An accessible surface area of the oxygen conducting phase below this general bound tends to allow carbon deposition to occur unabated, or results in exceeding a carbon deposition limit over the oxidation time frame. In such a situation, the surface area ratio of catalytically active phase to oxygen conducting phase is high, and the coverage ratio as defined herein would be generally higher than optimum. Alternatively, and generally speaking, the accessible surface area of the oxygen conducting phase relative to the catalytically active phase has an upper bound based on the relative catalytic activity between the catalytically active phase and the oxygen conducting phase. If the oxygen conducting phase has an accessible surface area beyond the general upper bound, such that the ratio of catalytically active phase to oxygen conducting phase is low, then sufficient exposure to the gaseous stream will be present, however the limited availability of the catalytically active phase will result in excessive catalysis on the oxygen conducting phase itself. This limits the ability of the oxygen conducting phase to replenish lattice oxygen, and further can lead to breakdown of the oxygen conducting phase by the residence of catalysis products on the oxygen conducting phase, which, relative to the catalytically active phase, is a poor catalyst. These impacts reduce catalyst system life and result in performance outside a specified chemical composition and carbon deposition limit over an oxidation time period. In this situation, the surface area ratio of catalytically active phase to oxygen conducting phase is low, and the coverage ratio as defined herein would be generally lower than optimum.

Figure 2:
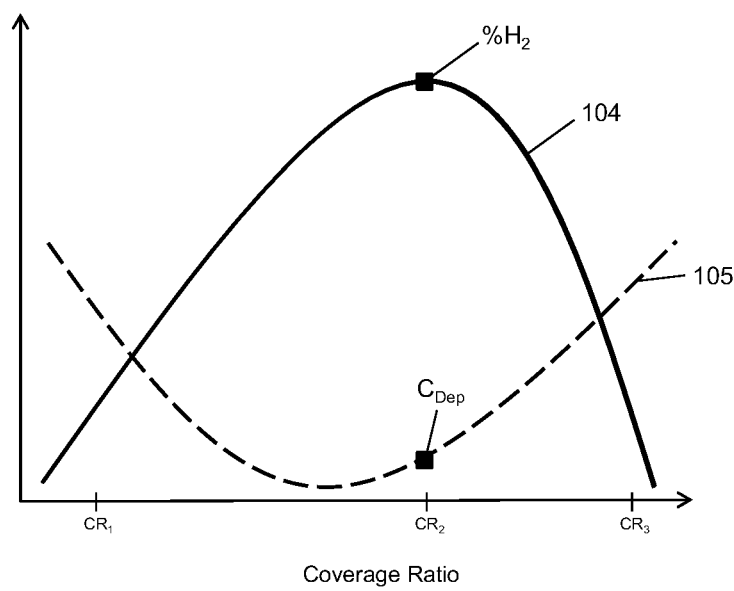
FIG. 2 illustrates a possible variance between a specified chemical composition and carbon deposition based on varying values of the coverage ratio.

The impact of the coverage ratio can be conceptually illustrated with reference to FIG. 2. FIG. 2 generically represents a chemical composition as curve 104 and a carbon deposition limit as curve 105. For illustrative purposes, at FIG. 2 curve 104 represents an $H_2$ yield resulting from an oxidation process on a gaseous stream comprised of $C_nH_m$, while curve 105 represents carbon deposition as determined by post-process temperature programmed oxidation, or some other method effective to determine carbon deposition and known to those skilled in the art. The x-axis indicates increasing coverage ratios, such that $CR_1 < CR_2 < CR_3$. Curves 104 and 105 are superimposed to provide an indication of general increases and decreases with respect to the y-axis, and the curves are not scaled with respect to each other. FIG. 2 represents performance over a process time period for a specific set of oxidation conditions, where the oxidation conditions are comprised of a temperature, a pressure, an O/C ratio in the gaseous stream, and a GHSV, where the GHSV is defined with respect to the weight of the catalytically active phase. Further, the $H_2$ yield of curve 104 and the carbon deposition of curve 105 represent values following the process time period, where the process time period is the duration of the oxidation process at the oxidation conditions.

At FIG. 2, at lower coverage ratios such as $CR_1$, the relative degree of surface area of the catalytically active phase is low as compared to the total surface area of the catalytically active phase and the oxygen conducting phase, as previously indicated. The low surface area of the catalytically active phase acts to provide some degree of conversion of $C_nH_m$ to $H_2$, however the conversion is limited due to the low amount of surface area presented to the gas stream. Similarly, the low coverage ratio implies a high surface area of the oxygen conducting phase exposed to the gaseous stream. The high surface area of the oxygen conducting phase may allow replenishment of lattice oxygen and initially maintain carbon deposition at a low level, however the high surface area of the oxygen conducting phase also encourages catalysis of $C_nH_m$ to $H_2$ during the process time period and, as previously discussed, the oxygen conducting phase is generally a poor catalyst as compared to the catalytically active phase. As a result, over the process time period, catalysis on the oxygen conducting phase allows residency of molecules tending to break down the structure of the oxygen conducting phase, which dramatically limits oxygen transfer from the gaseous stream and allows for carbon buildup. As a result of these effects, at the lower coverage ratio $CR_1$, conversion of $C_nH_m$ to $H_2$ is generally lower and carbon deposition is generally higher.

Alternatively, at FIG. 2, at higher coverage ratios such as $CR_3$, the relative degree of surface area of the catalytically active phase is high as compared to the total surface area of the catalytically active phase and the oxygen conducting phase. This presents a high surface area of the catalytically active phase to the gaseous stream and will generally provide a high conversion of $C_nH_m$ to $H_2$ over some limited period less than the process time period, however the limited surface area of the oxygen conducting phase limits the replenishment of lattice oxygen from the oxidant in the gaseous stream, and atomic carbon builds on the catalyst system and occludes the active metal sites within the catalytically active phase, reducing the conversion to $H_2$. As a result of these effects, over the process time period at the coverage ratio $CR_3$, conversion of $C_nH_m$ to $H_2$ is limited and carbon deposition is high.

At coverage ratio $CR_2$, a measure of balance is struck such that the conversion of $C_nH_m$ to $H_2$ is relatively high and the resulting carbon deposition is relatively low. At coverage ratio $CR_2$, over the process time period, the surface area of the catalytically active phase is sufficient for the majority of catalysis to occur on the catalytically active phase as opposed to the oxygen conducting phase, and the surface area of the oxygen conducting phase is sufficient to replenish lattice oxygen from the gaseous stream at a rate mitigating carbon deposition on the active sites within the catalytically active phase. As a result, the catalysis on the catalytically active phase is more readily maintained during the process time period and conversion of $C_nH_m$ to $H_2$ is relatively high. For the example discussed and within the terminology of this disclosure, the coverage ratio $CR_2$ provides a specified chemical composition corresponding to % $H_2$ and a carbon deposition limit corresponding to $C_{Dep}$ at FIG. 2, for the set of oxidation conditions represented by the O/C ratio of the gaseous stream, the temperature and pressure of the gaseous stream, the GHSV of the oxidation process, and over the process time period.

It is understood that FIG. 2 is not intended to illustrate a coverage ratio which is most advantageous, but is rather intended to illustrate the varying effects on the specified chemical composition and carbon deposition limit as the coverage ratio is varied. A coverage ratio such as $CR_2$ may be most advantageous in a process where chemical composition is paramount and some degree of carbon deposition can be tolerated, but the coverage ratio utilized is application specific. In a separate application where minimization or elimination of carbon deposition is paramount, a coverage ratio less than $CR_2$ at FIG. 2 might be considered the most advantageous. Within this disclosure, it is only necessary that a catalyst system comprised of a catalytically active phase comprised of a crystal structure having at least one metal as a cation coordinated with oxygen atoms within the crystal structure be in physical contact with an oxygen conducting phase such that the catalyst system displays a coverage ratio, where the coverage ratio is such that the oxidation process produces a specific chemical composition and a carbon deposition less than a carbon deposition limit under the oxidation conditions of the oxidation process.

An advantageous coverage ratio for a specific application under specified oxidation conditions may be determined through the performance of catalyst systems prepared at various coverage ratios, for example $CR_1$, $CR_2$, and $CR_3$. The performance of the catalyst systems may then be evaluated by contacting the initial catalyst system with a representative gas stream under the specified oxidation conditions, and monitoring the product gaseous stream produced and the carbon formed during the process time period. During the evaluation, the representative gas stream is at the oxidation temperature and the oxidation pressure, and has a composition substantially equivalent to the gaseous stream for the specific application. Here, "substantially equivalent" means a composition having molar percentages matching the gaseous stream for the specific application within testing tolerances. This evaluation is conducted for each coverage ratio and the results are recorded. This process generates a plurality of evaluation points based on coverage ratio, product composition over the process time period, and carbon deposition on the catalyst system at the coverage ratios. The quantity of coverage ratios evaluated is determined by a user, and may be based on, for example, bracketing a minimum carbon deposition, bracketing a specific product composition, general knowledge of the catalytically active phase and oxygen conducting phase under evaluation, or other criteria germane to the catalyst system and the specific application intended. The plurality of evaluation points may then be evaluated and the advantageous coverage ratio selected based on the product composition, the carbon deposition, and the desired outcome the specific application.

It is further understood that the coverage ratio may be achieved by altering various parameters and the methodology by which the coverage ratio is varied is not intended as a limitation of this disclosure. For example, the coverage ratio may be varied by increasing or decreasing the number of deposited catalytic activity phase sites where the sites have a relatively constant volume-to-surface area, or the coverage ratio may be varied by alteration of the volume-to-surface area ratio of the catalytic activity phase or the oxygen conducting phase, through other means which may be envisioned. Methodologies suitable for the deposition of the catalytically active phase onto the oxygen conducting phase may be incipient wetness impregnation, solid state mixing followed by thermal treatment, lithography, RF plasma sputtering, or other methods known in the art.

The oxygen conducting phase of this disclosure is a material having oxygen vacancies and an oxygen storage capacity under the applicable oxidation conditions, such that reversible addition and removal of oxygen may occur. For example, $CeO_2$, $ZrO_2$, $SrCeO_3$, lanthanide oxides, $V_2O_5$, $Cr_2O_3$, $ZnO$, $Fe_2O_3$, $MoO_3$, $WO_3$, $PbO$, $Bi_2O_3$, among others. In an exemplary embodiment, the oxygen conducting phase is ceria, rare earth doped ceria, zirconia, or transition metal stabilized zirconia. As is understood, oxygen conductivity in these materials results from ion conductivity or diffusion in oxides due of the presence of imperfections or defects in the lattice. The extent of nonstoichiometry and the defect concentration in solids are functions of the temperature and the partial pressure of their chemical components. As the partial pressure of the metal component is negligible compared with that of oxygen under most experimental conditions, nonstoichiometry is correspondingly a result of the interaction of the oxide with the oxygen in the surrounding gas atmosphere. Oxygen ion conduction depends on the presence of interstitial oxygen ions or of oxygen vacancies. See e.g., Gellings et al., "Ion and mixed conducting oxides as catalysts", *Catalysis Today* 12 (1992), among others.

The optimal ratio for a given catalytically active phase and oxygen conducting phase for the catalyst system is determined for a set of oxidation conditions. The oxidation conditions are sufficient to oxidize carbon in the gaseous stream when the gaseous stream is in contact with the catalyst system (and hydrogen as in the case of combustion). The oxidation conditions may be comprised of an oxidation temperature, an oxidation pressure, an O/C ratio in the gaseous stream, and a Gas Hourly Space Velocity.

In order to prepare the disclosed catalyst system, the catalytically active phase may be deposited onto the oxygen conducting phase at various ratios using methods known in the art and evaluated for activity and carbon formation under the oxidation conditions. The coverage ratio producing the chemical composition and carbon deposition limit desired may then be utilized in subsequent oxidation processes under substantially equivalent oxidation conditions to accomplish the specified chemical composition and carbon deposition limit in the operating environment.

DESCRIPTION OF A PREFERRED EMBODIMENT

Catalyst systems of varying coverage ratios were prepared and evaluated in order to determine advantageous coverage ratios under representative oxidation conditions.

The catalytically active phase was nickel-substituted hexaaluminate with the formula $BaNi_{0.4}Al_{11.6}O_{18}$ (BNHA). This material was prepared by the co-precipitation of nitrate precursors dissolved in de-ionized water (DIW) dropped into excess ammonium carbonate solution. The precipitates were aged, filtered and rinsed with DIW, and dried at 110° C. This was followed by a low-temperature heat treatment at 425° C. to decompose the carbonates to an amorphous mixed oxide powder. This powder was then calcined at 1300° C. to form the hexaaluminate phase. The oxygen conducting phases evaluated were commercial zirconium-doped ceria (ZDC) and gadolinium-doped ceria (GDC). The catalytically active phase was deposited onto the oxygen conducting phases by solid-state mixing with the ZDC and GDC powders followed by heat treatment at 950° C. to establish intimate contact between the catalytically active phase and oxygen conducting phases. The catalyst systems containing ZDC were prepared with coverage ratios corresponding to three weight loadings of BNHA (1, 10, and 20%). The 1 wt % BNHA/ZDC catalyst was prepared by an impregnation method, instead of SSM. The catalysts containing GDC were prepared with coverage ratios corresponding to BNHA weight loadings of 10, 20, and 50%.

The catalyst systems were tested for their activity and stability for the catalytic partial oxidation (CPOx) of n-tetradecane (TD) containing sulfur and polyaromatic contaminants to represent a diesel-type fuel. The activity can be presented as hydrocarbon conversion, hydrogen and carbon monoxide production, yield, or selectivity. The experiments were conducted isothermally at 900° C., an O/C=1.2, a GHSV=50,000 $cm^3/g_{cat}$·hour, a pressure of 1 atm, a total inlet gas flow rate of 400 sccm, and TD and $O_2$ concentrations of 2.17 and 18.22 vol %, respectively. The tests were run for 2 hours on pure TD, followed by 2 hours on TD plus contaminants, and then 1 hour on pure TD to observe catalyst recovery. Carbon deposition was measured by temperature programmed oxidation (TPO) using 10% $O_2/N_2$ and a ramp rate of 1° C./min.

Results and Discussion

Figure 3:
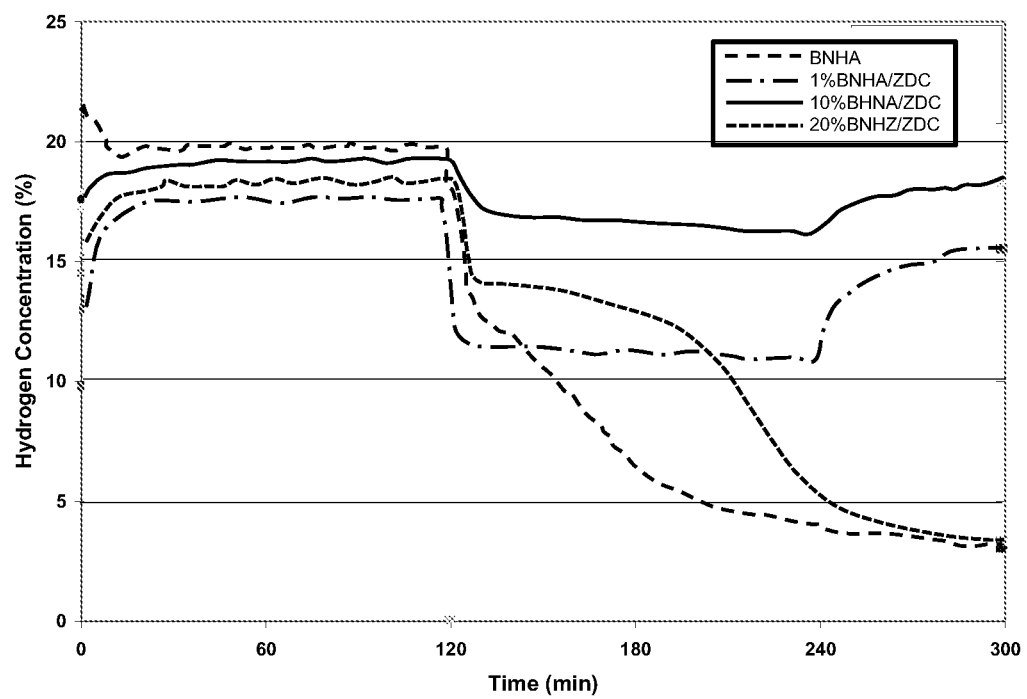
FIG. 3 illustrates the performance of a specific embodiment of the disclosure.

The data for the first set or CPOx experiments are presented in FIG. 3. The hydrogen production for each catalyst is plotted versus time. The catalyst containing 10 wt % BNHA deposited onto ZDC (10% BNHA/ZDC) demonstrated the best overall performance with stable hydrogen production throughout the test and nearly full recovery after the contaminants were removed. The hydrogen level for this run during the first 2 hours of the test is approximately equal to the equilibrium concentration.

Both the pure BNHA and the 20% BNHA/ZDC catalysts deactivated completely within two hours of testing on the TD plus contaminants, although the 20% BNHA/ZDC catalyst deactivated more slowly. The 1% BNHA/ZDC catalyst demonstrated similar stability to the 10% BNHA/ZDC catalyst, but with lower overall hydrogen production. It should be noted that this run contained approximately ¼ of the total mass of catalyst as the other runs due to size limitations of the reactor for such a low level of BNHA loading.

Figure 4:
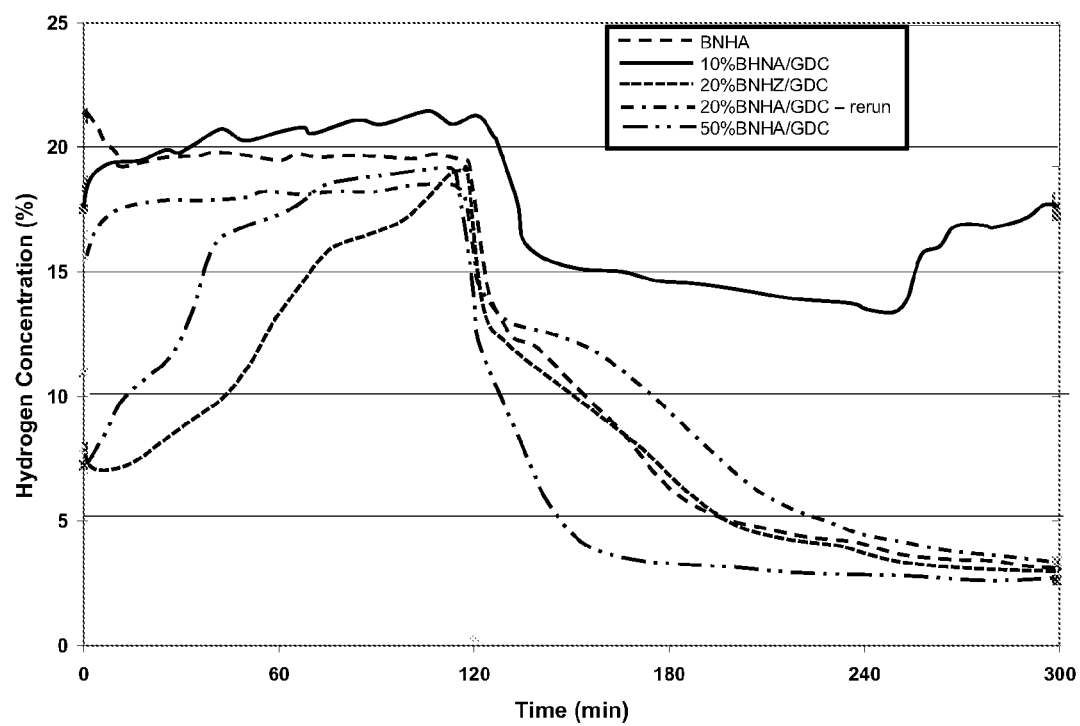
FIG. 4 illustrates the performance of a second specific embodiment of the disclosure.

FIG. 4 contains the results for the CPOx experiments on the BNHA catalysts with GDC. As with ZDC, the best performance was observed for the 10% BNHA/GDC catalyst; however, the performance is not as stable, and the recovery after the removal of contaminants is not as significant. Further, the deactivation for the 20% BNHA/GDC catalyst in the presence of contaminants is more rapid. The lowest level of performance was observed for the catalyst that contained 50 wt % BNHA.

The carbon formed during each CPOx experiment was measured by TPO after each run, and the calculated values are summarized in Table 1. For the ZDC containing catalysts the carbon formed on the 10% and 20% BNHA/ZDC catalysts was significantly lower than the bulk BNHA indicating a reduction in deactivation from carbon. Interestingly, the 1% BNHA/ZDC formed more carbon than the BNHA suggesting that additional carbon was formed on the ZDC material as it became reduced throughout the run.

For the GDC containing materials the 10% and 20% BNHA/GDC catalysts produced approximately the same amount of carbon as the bulk BNHA. This is not surprising for the 20% BNHA/GDC since it deactivated as quickly as the BNHA. The carbon formed on the 10% BNHA/GDC, which exhibited slower deactivation and partial recovery, suggests that the presence of an OCS can promote activity even in the presence of carbon accumulation. The 50% BNHA/GDC catalyst produced relatively low levels of carbon accumulation, but this is due to the lower overall conversion of TD, even before the contaminants were introduced.

TABLE 1

Total Bed Carbon (TBC) for BNHA Catalyst Layered Onto ZDC and GDC.

| Catalyst | TBC (g) |
| --- | --- |
| BNHA | 0.87 |
| 1% BNHA/ZDC* | 0.95 |
| 10% BNHA/ZDC | 0.43 |
| 20% BNHA/ZDC | 0.65 |
| 10% BNHA/GDC | 0.92 |
| 20% BNHA/GDC | 0.84 |
| 20% BNHA/GDC-rerun | 0.94 |
| 50% BNHA/GDC | 0.53 |

The disclosure herein thus provides a catalyst system where an active catalytic component can be dispersed on an oxygen conducting phase in a manner that mitigates concerns associated with sintering, intermetallic formation, or other reactions typically identified as the limiting impact on support loading. The catalyst system provides sufficient stability to the active metal sites under applicable operating conditions to provide additional freedoms in the active metal loading and the relative quantities of the active metal and an oxygen conducting phase, offering general improvement in catalytic performance. The relationship between the dispersed active metal sites and the oxygen conducting phase provides for an optimization of product composition and carbon deposition in an oxidation process, enhancing the performance of the catalyst system over an expected lifetime. The catalyst system incorporates mode of operation between active metal sites bound within the structure of a crystal lattice and the oxygen conducting phase based on the oxidation conditions of a specific application, in order to design the catalyst system for a performance based on the specific application and end-user preferences.

Thus, the disclosure provides a catalyst system having a catalytically active phase dispersed on an oxygen conducting solid, where the catalytically active phase incorporates active metal sites bound within the crystal lattice of a host structure.

Further, the disclosure provides a catalysts system whereby the crystal structure having active metal sites may be dispersed on the oxygen conducting phase in a manner providing for optimum product composition with mitigated carbon deposition.

Further, the disclosure provides a means by which an optimum coverage ratio of the catalytically active phase on the oxygen conducting phase may be determined for a specific application of an oxidation process.

Further, the disclosure provides a means by which oxygen exchange between a gaseous stream containing hydrocarbons and an oxidant may be optimized based on catalysis at the active sites, as opposed to limitations imposed by sintering, intermetallic formation, or other reactions typically identified as the limiting impact on metal loading.

Further, the disclosure provides a means for achieving a mode of operation between active metal sites bound within the structure of a crystal lattice and the oxygen conducting phase based on the oxidation conditions of a specific application, in order to prepare the catalyst system for a performance based on the specific application and end-user preferences.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not All publications and patent documents cited in this application are incorporated by reference in their entirety for all purposes to the same extent as if each individual publication or patent document were so individually denoted.

What is claimed is:

1. A method of establishing a final coverage ratio for a catalyst system in an oxidation process comprising:
   selecting a catalytically active phase where the catalytically active phase is comprised of a crystal structure, where the crystal structure is comprised of at least one metal, where the at least one metal is a cation within the crystal structure and coordinated with oxygen atoms within the crystal structure, and selecting an oxygen conducting phase;
   generating an initial catalyst system, where the initial catalyst system is comprised of the catalytically active phase and further comprised of the oxygen conducting phase in physical contact with the catalytically active phase;
   determining a coverage ratio of the initial catalyst system, where the coverage ratio of the initial catalyst system is defined as the ratio of a catalyst surface area to a total surface area, where the catalyst surface area is the surface area of the catalytically active phase comprising the initial catalyst system, and where the total surface area is a summation of the catalyst surface area and the surface area of the oxygen conducting phase comprising the initial catalyst system,
   recording the coverage ratio of the initial catalyst system;
   establishing a gaseous stream comprised of a hydrocarbon and an oxidant and having an O/C ratio, where the catalyst system is an active catalyst for an oxidation reaction of the hydrocarbon under a set of oxidation conditions, where the set of oxidation conditions is comprised of the O/C ratio, an oxidation temperature, an oxidation pressure, and a Gas Hourly Space Velocity;
   contacting the initial catalyst system and the gaseous stream at the oxidation conditions for a process time period, thereby generating the oxidation process and thereby generating oxidation products having a specified chemical composition, where the specified chemical composition is the molar percentage of at least one constituent in the oxidation products;
   evaluating an initial carbon accumulation for the initial catalyst system, where the initial carbon accumulation is the carbon formed on the initial catalyst system during the process time period;
   monitoring and recording the specified chemical composition over the process time period and recording the initial carbon accumulation of the initial catalyst system;
   composing a subsequent catalyst system, where the subsequent catalyst system is comprised of the catalytically active phase and further comprised of the oxygen conducting phase in physical contact with the catalytically active phase, and determining a subsequent coverage ratio, where the subsequent coverage ratio is defined as the ratio of a subsequent catalyst surface area to a subsequent total surface area, where the subsequent catalyst surface area is the surface area of the catalytically active phase comprising the subsequent catalyst system, and where the subsequent total surface area is a summation of the subsequent catalyst surface area and the surface area of the oxygen conducting phase comprising the subsequent catalyst system, and where the subsequent coverage ratio of the subsequent catalyst system is not equal to the coverage ratio of any initial catalyst system utilized in the recording step, the contacting step, the evaluating step, or the monitoring step;
   repeating the recording the coverage ratio of the initial catalyst system step, the establishing step, the contacting step, the evaluating step, and the monitoring step using the subsequent catalyst system as the initial catalyst system and using the subsequent coverage ratio as the coverage ratio, thereby recording a plurality of coverage ratios and a plurality of initial carbon accumulations and a plurality of specified chemical compositions; and
   reviewing the plurality of coverage ratios and the plurality of initial carbon accumulations and the plurality of specified chemical compositions and selecting the final coverage ratio, where the final coverage ratio is an individual coverage ratio in the plurality of coverage ratios, and thereby establishing the final coverage ratio for the catalyst system in the oxidation process.

2. The method of claim 1 where the oxidation process is a partial oxidation, steam reforming, $CO_2$ reforming, or a combination thereof, such that a majority of the carbon comprising the hydrocarbons oxidized in the oxidation process is oxidized to carbon monoxide.

3. The method of claim 1 where the oxidation process is a combustion, such that a majority of the carbon comprising the hydrocarbons oxidized in the oxidation process is oxidized to carbon dioxide.

4. The method of claim 1 where the catalytically active phase is a perovskite, a hexaaluminate, a pyrochlore, or mixtures thereof.

5. The method of claim 1 where the oxygen conducting phase is comprised of ceria, rare earth doped ceria, zirconia, transition metal stabilized zirconia, or mixtures thereof.

6. The method of claim 1 where the gaseous stream comprised of hydrocarbons is further comprised of sulfur.

7. The method of claim 1 where the catalytically active phase is a plurality of deposit sites, and where the coverage ratio of the initial catalyst system is determined by a deposit size and a representative displacement, and where the deposit size is an average surface area of a deposit site in the plurality of deposit sites, and where the catalyst surface area is the area of the plurality of single deposit sites, and where the representative displacement is an average distance between a given deposit site in the plurality of deposit sites and a nearest neighbor deposit site in the plurality of deposit sites.

8. The method of claim 1 where the catalytically active phase is a metal incorporated into a lattice of a mixed metal oxide having a crystal structure, and where the oxygen conducting phase is a metal oxide or mixed metal oxide.

9. The method of claim 8 where the crystal structure is a perovskite, hexaaluminate, pyrochlore, or mixtures thereof.

10. The method of claim 9 where the hexaaluminate is represented by the structure $AB_yAl_{12-y}O_{19}$, the pyrochlore is represented by the structure $A_2B_2O_7$, and the perovskite is represented by the structure $ABO_3$, where B is comprised of a primary B component and a B-site dopant, where the primary B component and the B-site dopant are different elements, and where the molar quantity of the B-site dopant is greater than zero and less than or equal to the molar quantity of the primary B component, and where the at least one metal is the B-site dopant.

11. The method of claim 1 where the catalytically active phase is further comprised of active metals residing on the surface of the crystal structure.

12. The method of claim 1 further comprising:
delineating a carbon deposition limit, where the carbon deposition limit is an amount of carbon deposition on the catalyst system over the process time period; and
ensuring that the initial carbon accumulation produced by the final coverage ratio is less than or equal to the carbon deposition limit.

13. A method of establishing a final coverage ratio for a catalyst system in an oxidation process comprising:
selecting a catalytically active phase, where the catalytically active phase is comprised of a crystal structure, where the crystal structure is a perovskite, a hexaaluminate or a pyrochlore, and where the crystal structure is comprised of at least one metal, where the at least one metal is a cation within the crystal structure and coordinated with oxygen atoms within the crystal structure, and selecting an oxygen conducting phase, where the oxygen conducting phase is a metal oxide or mixed metal oxide;
generating an initial catalyst system, where the initial catalyst system is comprised of the catalytically active phase and further comprised of the oxygen conducting phase in physical contact with the catalytically active phase;
determining a coverage ratio of the initial catalyst system, where the coverage ratio of the initial catalyst system is defined as the ratio of a catalyst surface area to a total surface area, where the catalyst surface area is the surface area of the catalytically active phase comprising the initial catalyst system, and where the total surface area is a summation of the catalyst surface area and the surface area of the oxygen conducting phase comprising the initial catalyst system,
recording the coverage ratio of the initial catalyst system;
establishing a gaseous stream comprised of a hydrocarbon and an oxidant and having an O/C ratio, where the catalyst system is an active catalyst for an oxidation reaction of the hydrocarbon under a set of oxidation conditions, where the set of oxidation conditions is comprised of the O/C ratio, an oxidation temperature, an oxidation pressure, and a Gas Hourly Space Velocity;
contacting the initial catalyst system and the gaseous stream at the oxidation conditions for a process time period, thereby generating the oxidation process and thereby generating oxidation products having a specified chemical composition, where the specified chemical composition is the molar percentage of at least one constituent in the oxidation products;
evaluating an initial carbon accumulation for the initial catalyst system, where the initial carbon accumulation is the carbon formed on the initial catalyst system during the process time period;
monitoring and recording the specified chemical composition over the process time period and recording the initial carbon accumulation of the initial catalyst system;
composing a subsequent catalyst system, where the subsequent catalyst system is comprised of the catalytically active phase and further comprised of the oxygen conducting phase in physical contact with the catalytically active phase, and determining a subsequent coverage ratio, where the subsequent coverage ratio is defined as the ratio of a subsequent catalyst surface area to a subsequent total surface area, where the subsequent catalyst surface area is the surface area of the catalytically active phase comprising the subsequent catalyst system, and where the subsequent total surface area is a summation of the subsequent catalyst surface area and the surface area of the oxygen conducting phase comprising the subsequent catalyst system, and where the subsequent coverage ratio of the subsequent catalyst system is not equal to the coverage ratio of any initial catalyst system utilized in the recording step, the contacting step, the evaluating step, or the monitoring step;
repeating the recording the coverage ratio of the initial catalyst system step, the establishing step, the contacting step, the evaluating step, and the monitoring step using the subsequent catalyst system as the initial catalyst system and using the subsequent coverage ratio as the coverage ratio, thereby recording a plurality of coverage ratios and a plurality of initial carbon accumulations and a plurality of specified chemical compositions; and
reviewing the plurality of coverage ratios and the plurality of initial carbon accumulations and the plurality of specified chemical compositions and selecting the final coverage ratio, where the final coverage ratio is an individual coverage ratio in the plurality of coverage ratios, and thereby establishing the final coverage ratio for the catalyst system in the oxidation process.

14. The method of claim 13 where the oxygen conducting phase is comprised of ceria, rare earth doped ceria, zirconia, transition metal stabilized zirconia, or mixtures thereof.

* * * * *